(12) United States Patent
Wang et al.

(10) Patent No.: US 9,866,277 B2
(45) Date of Patent: Jan. 9, 2018

(54) VEHICLE WIRELESS HUB

(76) Inventors: Adam James Wang, Palo Alto, CA (US); Zlatko Aurelio Filipovic, Palo Alto, CA (US); Brian Michael Wang, Palo Alto, CA (US)

( * ) Notice: Subject to any disclaimer, the term of this patent is extended or adjusted under 35 U.S.C. 154(b) by 0 days.

(21) Appl. No.: 13/209,576

(22) Filed: Aug. 15, 2011

(65) Prior Publication Data

US 2013/0045683 A1    Feb. 21, 2013

(51) Int. Cl.
*H04M 1/00* (2006.01)
*H04B 5/00* (2006.01)

(52) U.S. Cl.
CPC ......... *H04B 5/0031* (2013.01); *H04B 5/0037* (2013.01)

(58) Field of Classification Search
CPC .......... G07C 5/008; G08G 1/127; G08G 1/20; H04W 88/06
USPC ....................... 455/11.1, 95, 99, 569.2, 575.9
See application file for complete search history.

(56) References Cited

U.S. PATENT DOCUMENTS

| | | | | |
|---|---|---|---|---|
| 5,991,599 A * | 11/1999 | Uchikawa | ........................ | 455/20 |
| 6,345,186 B1 * | 2/2002 | Schultz | ................. | H04W 36/24 455/436 |
| 6,367,022 B1 * | 4/2002 | Gillespie | ................... | G06F 1/26 307/31 |
| 6,601,176 B1 * | 7/2003 | Alexander | ................ | G06F 1/24 713/1 |
| 6,778,895 B1 * | 8/2004 | Schwab | .................. | F16H 59/08 701/1 |
| 6,792,296 B1 * | 9/2004 | Van Bosch | ................ | 455/569.2 |
| 6,816,731 B1 * | 11/2004 | Maruyama | ............ | H04W 88/08 455/238.1 |
| 7,057,591 B1 * | 6/2006 | Hautanen | ............... | G06Q 30/02 345/211 |
| 7,324,840 B2 * | 1/2008 | Miyazaki et al. | ......... | 455/575.9 |
| 7,742,739 B2 * | 6/2010 | Diaz Cervera et al. | ..... | 455/11.1 |
| 8,219,132 B2 * | 7/2012 | Hayashi | ........................ | 455/517 |
| 8,319,742 B2 * | 11/2012 | Doktorova | ............ | G06F 3/0233 345/169 |
| 8,423,062 B2 * | 4/2013 | Yahagi | ................... | H04W 28/22 455/500 |
| 8,705,762 B2 * | 4/2014 | Davis | ............................. | 381/86 |
| 2004/0219876 A1 * | 11/2004 | Baker | ................ | H04B 7/15535 455/7 |
| 2006/0148533 A1 * | 7/2006 | Tanneberger | ......... | H04W 88/02 455/569.1 |
| 2007/0185627 A1 * | 8/2007 | Mavreas | ................ | G07C 5/008 701/2 |
| 2008/0043692 A1 * | 2/2008 | Morita | ................... | G08G 1/005 370/338 |
| 2008/0177436 A1 * | 7/2008 | Fortson | .............. | G05B 23/0221 701/31.4 |

(Continued)

*Primary Examiner* — Edward Urban
*Assistant Examiner* — Max Mathew
(74) *Attorney, Agent, or Firm* — Roark IP

(57) ABSTRACT

A vehicle wireless hub includes a vehicle power connector that can draw power from a vehicle battery on a vehicle, a first wireless transmission circuit that can send or receive data with base stations in a long-range wireless network, a second wireless transmission circuit that can provide a short-range wireless network and to transfer data to and from electronic devices, and a network processor that can process data in the first wireless transmission circuit and the second wireless transmission circuit. The vehicle power connector can supply power to the first wireless transmission circuit, the second wireless transmission circuit, and the network processor.

29 Claims, 7 Drawing Sheets

(56) References Cited

U.S. PATENT DOCUMENTS

| | | | |
|---|---|---|---|
| 2009/0131131 A1* | 5/2009 | Wilson | H04M 1/6075 455/575.9 |
| 2010/0279602 A1* | 11/2010 | Larsson | H04B 7/15535 455/7 |
| 2011/0022204 A1* | 1/2011 | Hatfield | H04M 1/6025 700/94 |
| 2011/0136446 A1* | 6/2011 | Komninakis | H04B 7/0691 455/78 |
| 2011/0143769 A1* | 6/2011 | Jones | G06F 1/1624 455/456.1 |
| 2011/0238855 A1* | 9/2011 | Korsunsky | G06F 21/55 709/231 |
| 2011/0286428 A1* | 11/2011 | Souissi | H04L 12/2812 370/331 |
| 2012/0027221 A1* | 2/2012 | Davis | H04B 1/3822 381/86 |
| 2012/0039212 A1* | 2/2012 | Kaliyaperumal | H04W 88/16 370/254 |
| 2012/0162866 A1* | 6/2012 | Bohn | G06F 1/1681 361/679.01 |
| 2012/0189410 A1* | 7/2012 | Toebes | B65G 1/0492 414/273 |
| 2012/0249887 A1* | 10/2012 | Hr | H04N 5/455 348/726 |
| 2012/0257368 A1* | 10/2012 | Bohn | H04M 1/022 361/809 |
| 2013/0034234 A1* | 2/2013 | Chen | H04M 1/72591 381/58 |
| 2013/0077228 A1* | 3/2013 | Batio | G06F 1/1641 361/679.29 |
| 2014/0012528 A1* | 1/2014 | Carmel-Veilleux | G01S 17/08 702/88 |

* cited by examiner

VEHICLE WIRELESS HUB

BACKGROUND OF THE INVENTION

The present invention relates to wireless network technologies.

Many electronic devices such as laptops, tablet computers, electronic readers, and portable media devices etc, can connect to the Internet via a local area, short-range, wireless network which can include WiFi (WLAN or wireless LAN), bluetooth, Zigbee, etc. However, short-range networks are typically tethered to physical connections, and are therefore only available in specific stationary locations. Many of these devices cannot connect to wide area, long-range, wireless networks such as mobile networks (WWAN) that use 3G and 4G base stations because they do not have the necessary hardware or subscriptions. Furthermore, current hotspot technologies are powered by small and weak batteries and can only allow mobile connectivity for short periods of time with limited wireless operational ranges.

Data and data processing have been increasingly migrating to remote servers as technologies shift towards cloud computing. Without Internet connections, access to data is limited on many devices. Privacy and reliability issues also arise, as users have less control over their own data when it is stored on second party servers.

There is therefore a need to provide users with ubiquitous, high signal strength, and always-on Internet connections and data accesses via short-range wireless networks

SUMMARY OF THE INVENTION

The disclosed long-range and short-range wireless network systems provide users with mobile, ubiquitous, and always-on Internet connections, short-range inter-device connections, and data accesses. The disclosed wireless network systems can provide Internet connections to devices without long-range wireless network connection capabilities.

The disclosed long-range wireless network systems can communicate with cellular base stations using existing and planned wireless standards and technologies, and provide short-range wireless networks based on current and future communication protocols. The disclosed short and long-range wireless network systems can be easily powered by existing facilities (e.g. vehicle cigarette lighter) common in vehicles.

The disclosed short and long-range wireless network technology is powered with a higher voltage and stronger power than current personal hotspot technologies, and thus can provide stronger wireless signal strength, longer operational time, and wider operation areas than conventional personal hotspot technologies.

The disclosed short and long-range wireless network systems allow multiple devices to connect to the Internet under a single, wide area wireless network subscription, which can mean a significant cost reduction for users.

The disclosed short and long-range wireless network systems also lead to the possibility of in-vehicle data storage, which can function as a personal server for a user's devices within or around the vehicle and can reduce network data traffic.

The disclosed short and long-range wireless network systems also allows for public sharing of short-range wireless networks and Internet access. This has the potential to significantly increase Internet access and the availability of short-range wireless networks to society at large.

In a general aspect, the present invention relates to a vehicle wireless hub that includes a vehicle power connector that can draw power from a vehicle battery on a vehicle, a first wireless transmission circuit that can send or receive data with base stations in a long-range wireless network, a second wireless transmission circuit that can provide a short-range wireless network capable of send or receive data and commands to and from electronic devices in the short-range wireless network, and a network processor that can process data in the first wireless transmission circuit and the second wireless transmission circuit. The vehicle power connector can supply power to the first wireless transmission circuit, the second wireless transmission circuit, and the network processor.

Implementations of the system may include one or more of the following. The vehicle power connector can be plugged into a cigarette lighter receptacle equipped in the vehicle to draw power from the vehicle battery. The vehicle power connector can be plugged into an I/O port equipped in the vehicle to draw power from the vehicle battery. The second wireless transmission circuit can transfer data to and from electronic devices in the short-range wireless network in a plurality of different wireless standards. The second wireless transmission circuit can communicate in the short-range wireless network in at least one of the wireless standards: WiFi, Bluetooth™, or Zigbee. The first wireless transmission circuit can send or receive data in the long-range wireless network in at least one of the wireless standards: Universal Mobile Telecommunications System (UMTS), WiMax, WiBro, 3GPP, LTE, or IMT-2000. The second wireless transmission circuit can include a base band processor, an RF transceiver, and an RF front-end circuit. The first wireless transmission circuit can include a base band processor, an RF transceiver, and an RF front-end circuit. The network processor can connect to an electronic control unit (ECU) in the vehicle, which allows users of the electronic devices to monitor and/or control the vehicle. The vehicle wireless hub can further include a power management unit configured to modify the voltage or current received from the vehicle power connector to supply power to the first wireless transmission circuit, the second wireless transmission circuit, and the network processor. The vehicle wireless hub can further include at least one of a global positioning system (GPS), an accelerometer, and an environmental sensor, which are in communication with the network processor and allow the electronic devices to monitor the location, the acceleration, temperature, safety, or security of the vehicle. The environmental sensor can detect gestures or voice instructions of a driver or a passenger, wherein the network processor and the second transmission circuit are configured to allow the driver or the passenger to control the vehicle. The vehicle wireless hub can further include a personal server connected to the short-range wireless network and configured to store or send data received by the electronic devices.

The vehicle wireless hub can further include an application processor in communication with the network processor, wherein the application processor can control the writing and retrieval of data in the personal server. The vehicle wireless hub can further include a rechargeable battery configured to be charged from a wall outlet or by the vehicle battery via the vehicle power connector, wherein the rechargeable battery is configured to supply power to the first wireless transmission circuit, the second wireless transmission circuit, and the network processor when the vehicle power connector is disconnected from the vehicle battery. The network processor and the second transmission circuit can provide the second wireless network to electronic devices in the vehicle. The network processor and the second transmission circuit can provide the short-range wireless network to electronic devices outside the vehicle. The network processor and the second transmission circuit can provide the short-range wireless network to electronic devices in other vehicles or in a building. The network processor and the second transmission circuit can provide the short-range wireless network to electronic devices while stationary or in motion. The network processor and the second transmission circuit can communicate with the second wireless transmission circuit in another vehicle to form a network mesh. The network processor and the long-range transmission circuit can communicate with a wireless device in a long-range wireless network, wherein the network processor and the short-range transmission circuit allow the wireless device to access or control the electronic devices connected to the short-range wireless network. The vehicle wireless hub can further include a personal server connected to the short-range wireless network and configured to store data received from or sent to the electronic devices, wherein the network processor and the short-range transmission circuit are configured to allow the wireless device to access the personal server connected to the short-range wireless network. The vehicle wireless hub can connect to an electronic control unit in the vehicle, wherein the network processor and the second transmission circuit are configured to allow the wireless device to monitor or control the vehicle. The second wireless transmission circuit can provide communication between the electronic devices.

BRIEF DESCRIPTION OF THE DRAWINGS

The following drawings, which are incorporated in and from a part of the specification, illustrate embodiments of the present specification and, together with the description, serve to explain the principles of the specification.

DETAILED DESCRIPTION OF THE INVENTION

Figure 1:
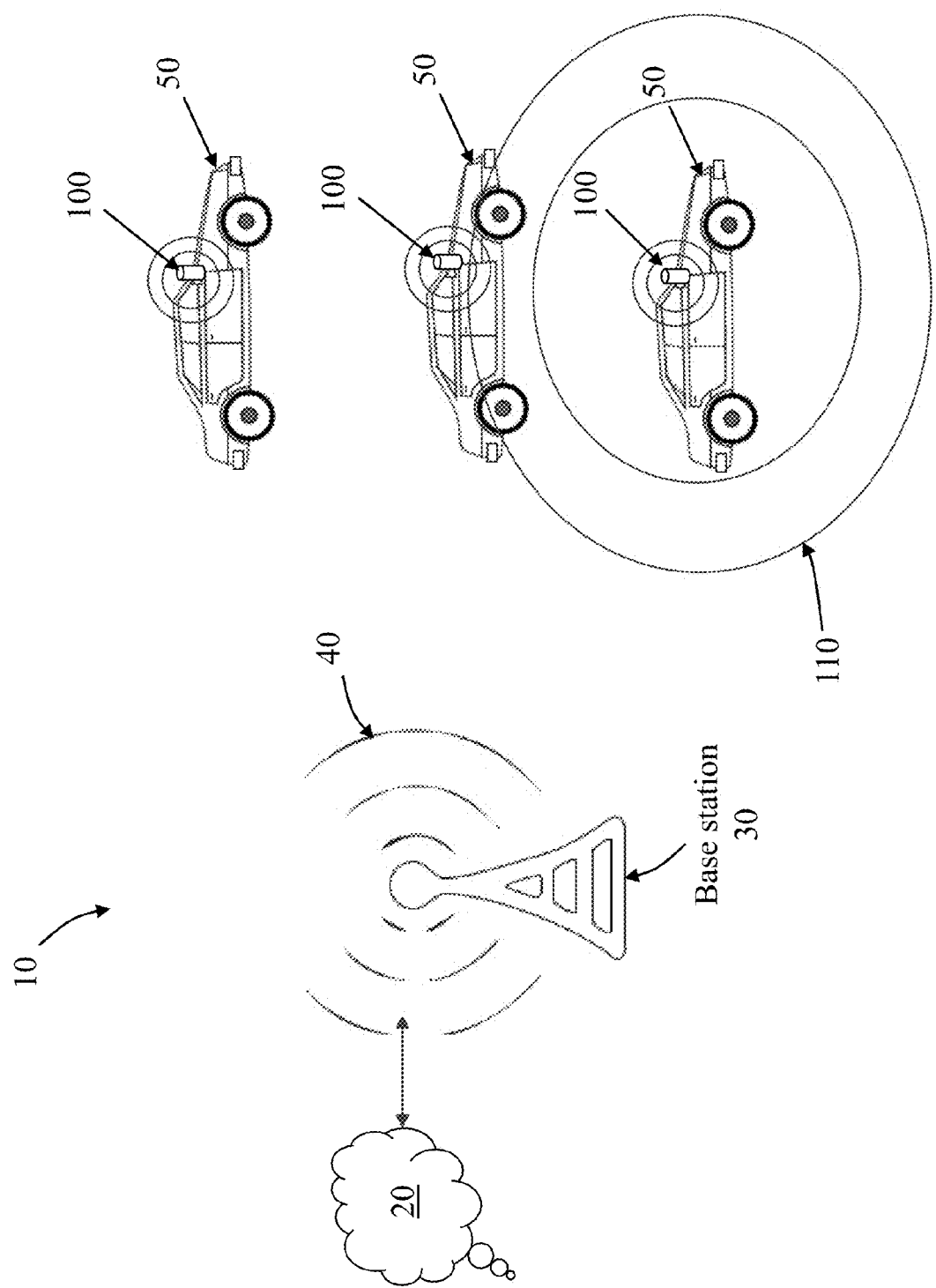
FIG. 1 is a block diagram showing short and long-range wireless network systems comprising vehicle wireless hubs in accordance with the present invention.

Referring to FIG. 1, a wireless network 10 includes Internet (or cloud) 20, and base stations 30 that provide long-range wireless networks 40. The long-range wireless networks 40 can be terrestrial or satellite based wireless wide area networks. Examples of terrestrial based long-range wireless standards include 2G, 3G, 4G cellular networks and beyond, for example, Universal Mobile Telecommunications System (UMTS), WiMax, WiBro, 3GPP, GSM, WCDMA, LTE, LTE-Advanced or IMT-2000. In accordance with the present invention, vehicles 50 located in the coverage area of the long-range wireless network 40 are equipped with vehicle wireless hubs (VWH) 100. The VWHs 100 can draw power from their respective vehicles 50, and have wireless connections with the base stations 30 and thus the Internet 20 via a long-range wireless network 40. The vehicles 50 can include almost any types of motor vehicles such as passenger cars, commercial trucks, buses, taxis, police cars, delivery vehicles, etc. The vehicles 50 can be stationary or in motion.

The present invention chooses vehicles as the platform for providing short-range wireless networks because of high ownership rates and the ubiquitous nature of motor vehicles in modern society. In the U.S. for example, the ownership rate of cars is seventy-eight cars per one hundred people. Cars are necessities for eighty-six out of every one hundred Americans.

Figure 2:
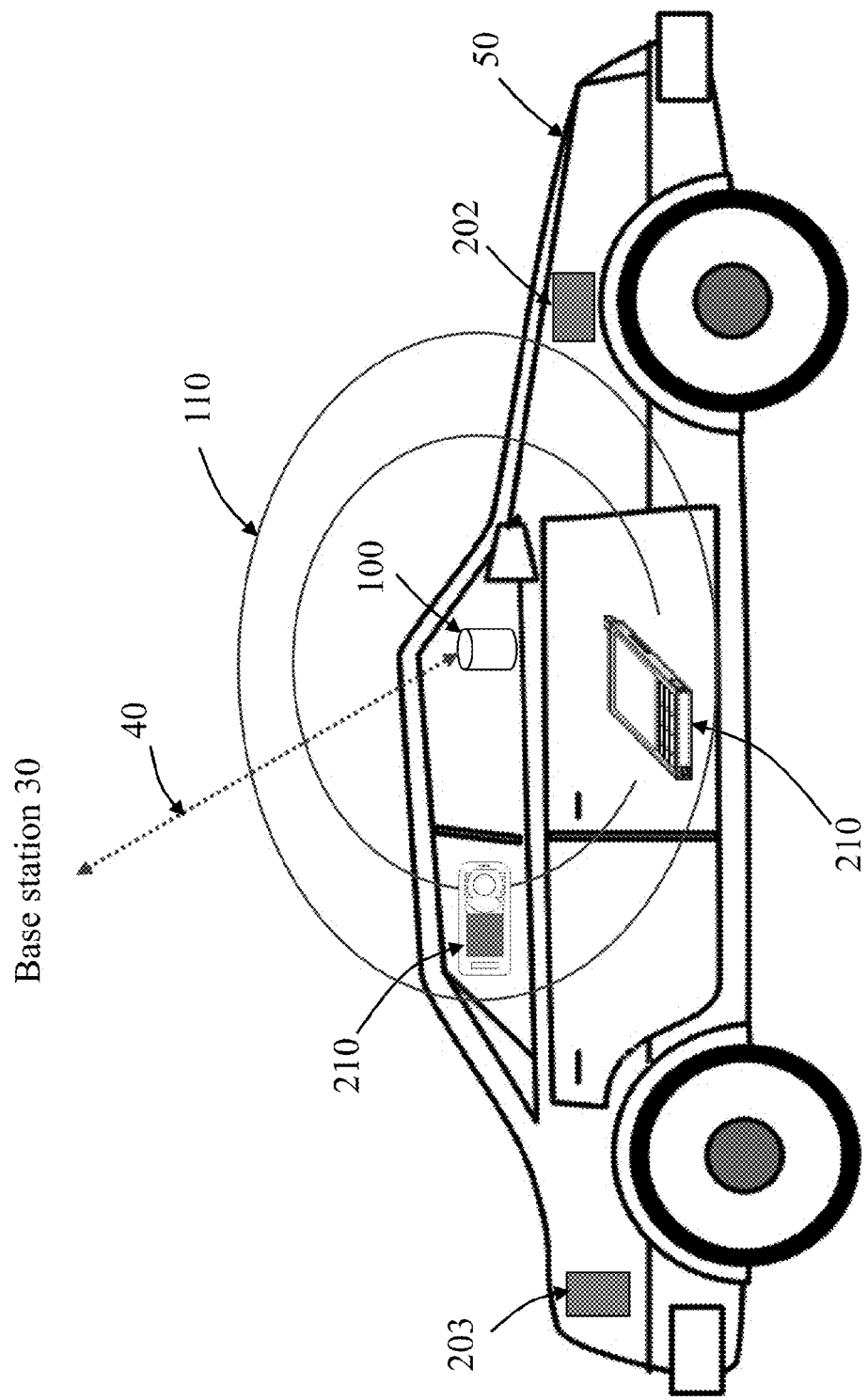
FIG. 2 is a schematic diagram showing a short-range wireless network enabled by a vehicle wireless hub in a vehicle in accordance with the present invention.

Each VWH 100 can produce a short-range wireless network 110 inside and around the vehicle in which the VWH 100 is installed. Examples of short-range wireless standards include WiFi (WLAN), Bluetooth™, Zigbee, etc. Referring to FIG. 2, a vehicle 50 often carries a number of electronic devices 210 that are capable of connecting to short-range wireless networks, but these devices may not have the hardware or the subscription to connect to long-range wireless networks. Examples of the electronic devices 210 include laptops, tablet computers, smart phones, electronic readers, and portable media devices. The electronic devices 210 may communicate in the short-range wireless networks 110.

Modern vehicles typically include an electronic control unit (ECU) 202. In some embodiments, the VWH 100 on a vehicle 50 can communicate with the vehicle's ECU 202, which allows the user to control his or her vehicle using mobile devices through the disclosed short-range or long-range wireless networks. For example, if a driver has forgotten to turn off a vehicle's headlights, he can use a wireless device turn it off from a distance. The driver can also remotely monitor the safety of his or her vehicle.

In some embodiments, the vehicle 50 can be installed with a personal server 203 that is in short-range wireless communication with the VWH 100. The personal server 203 can include data storage, applications processors, and graphics processors. The personal server 203 can be plugged into a cigarette lighter outlet or other connections within the vehicle, but also includes more memory and faster processors than typical electronic devices 210. The bulk of the data from the electronic devices 210 can be stored in the personal server 203, which can reduce data traffic through the long-range wireless networks 40 to the Internet 20. This personal server 203 can also be accessed by connecting first to the VWH 100 via a long-range network 40 and having the VWH 100 direct data through 3G and 4G networks. In this way, a wireless device not in range of the VWH 100 can access data on the personal server 203 via the long-range wireless network 40, through the VWH 100 and the short-range wireless network 110.

Figure 3A:
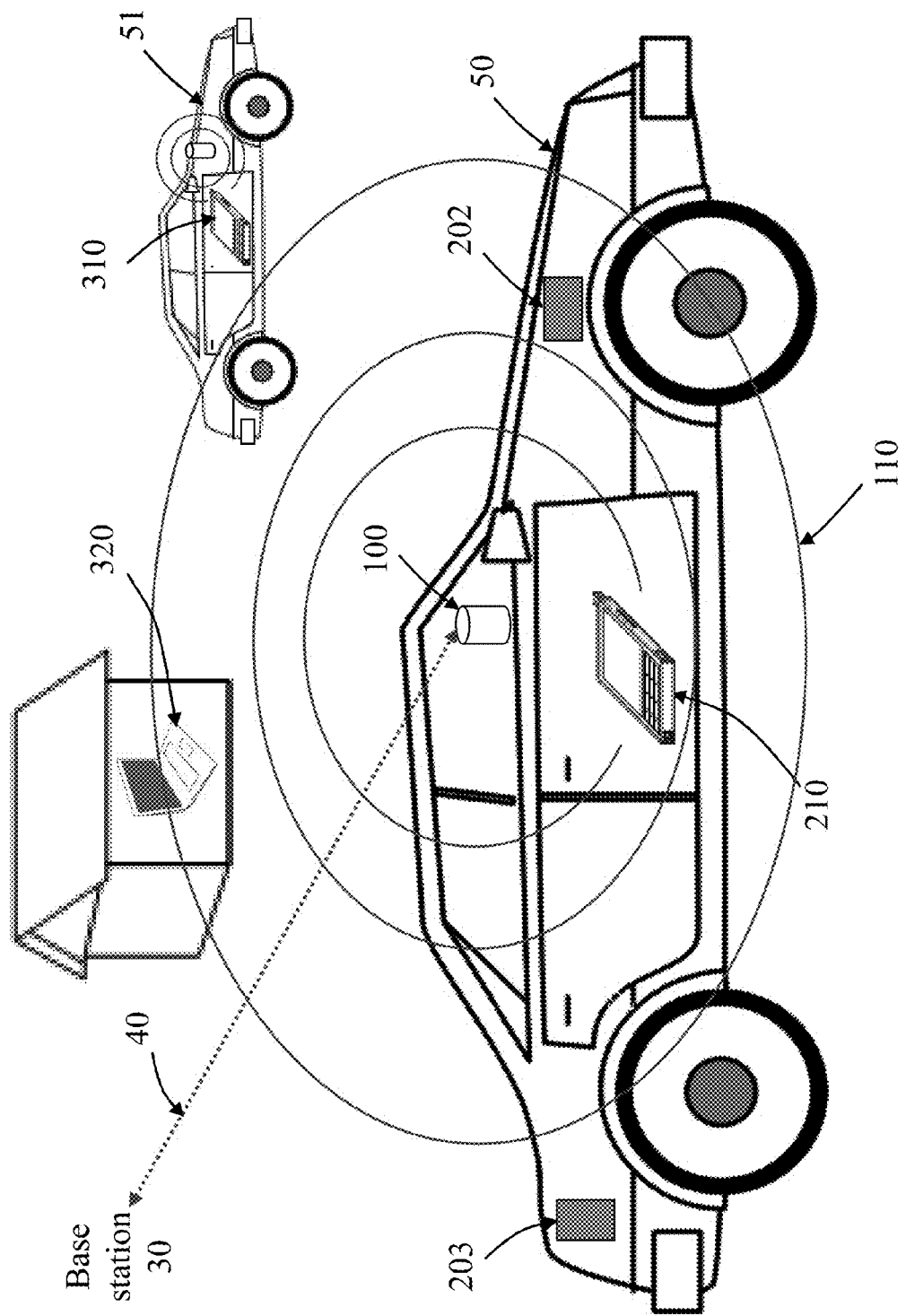
FIG. 3A is schematic diagram showing a short-range wireless network enabled by a vehicle wireless hub around a vehicle in accordance with the present invention.

Referring to FIG. 3A, the VWH 100 on a vehicle 50 can provide the short-range wireless network 110 for an electronic device 310 on a vehicle 51 nearby or a stationary electronic device 320 in a house, a building, or the ground. The short-range wireless network 110 allows the electronic devices 310, 320 to connect to the Internet 20 (FIG. 1) and to each other without access to a long-range wireless network.

Figure 3B:
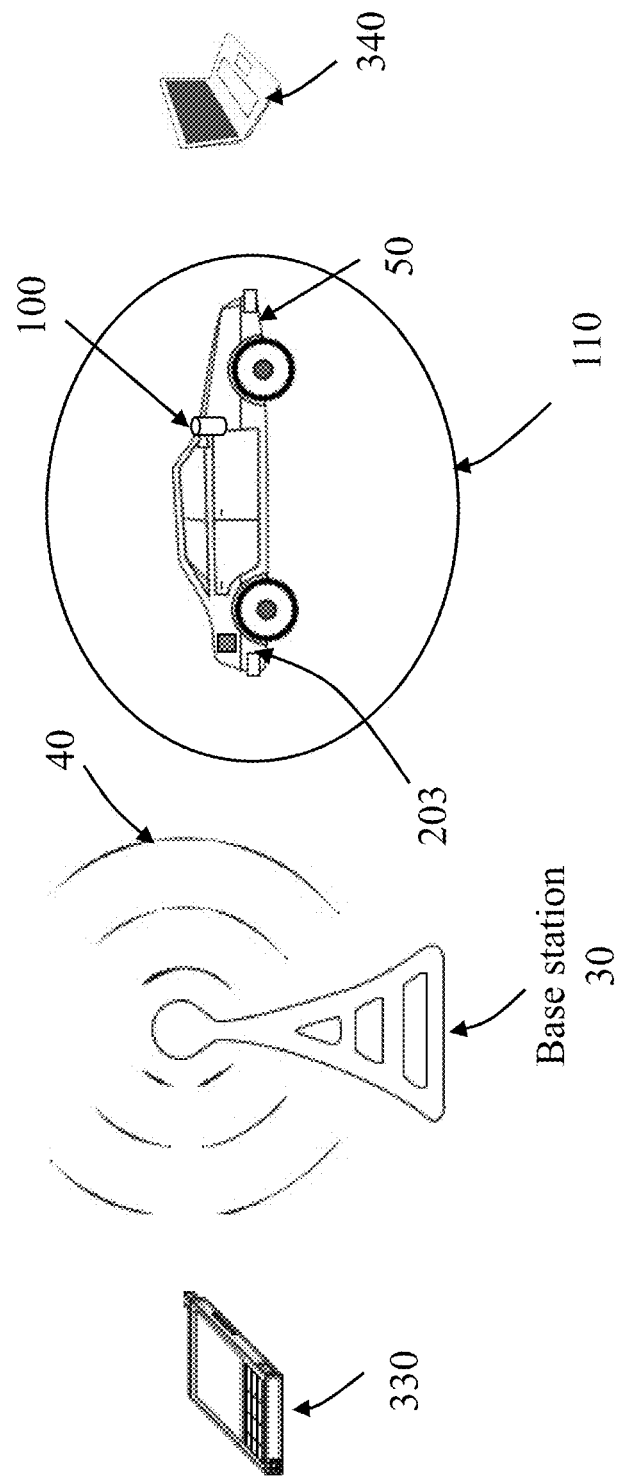
FIG. 3B is schematic diagram showing a wireless network enabled by a vehicle wireless hub around a vehicle in accordance with the present invention.

In some embodiments, referring to FIG. 3B, a mobile device 330 having access to the long-range wireless network 40 can connect to the VWH 100 on a vehicle 50, which can further access or control devices 340 connected to the VWH 100 via the short-range wireless network 110. For example, a mobile device connected to the long-range wireless network 40 can control another mobile device or access data on the personal server 203, via the VWH 100, from a location remote from the vehicle 50. The mobile device user can also control the vehicle 50 via the long-range wireless network 40 through the VWH 100 and then the ECU 202. This process could also work in reverse, with the device 340 connected to the VWH's 100 short-range wireless network controlling the device 330 connected to a long-range network. An advantageous feature of the presently disclosed system is that people are within a short distance from their vehicles most of the time. For example, cars are usually parked nearby when people are at home, at work, or go shopping. Thus, the vehicle based VWH can provide ubiquitous coverage during peoples' daily activities.

In some embodiments, electronic devices 210 in the short-range wireless network 110 can be used by any user in the vehicle and can share computing tasks. In some embodiments, VWH 100 on vehicles 50 and 51 can communicate with each other to create a network mesh for the electronic devices 210, 310 to share computing and memory resources.

Figure 4:
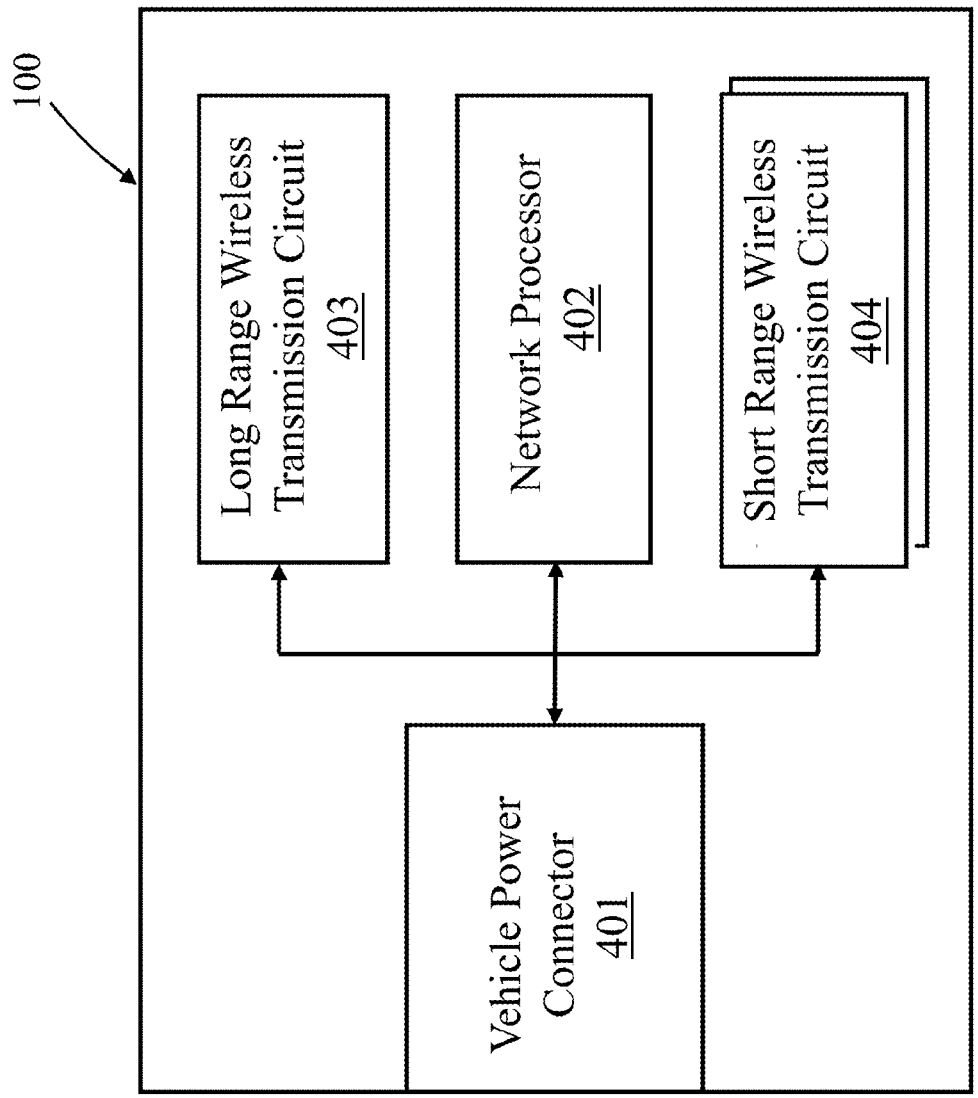
FIG. 4 is a system block diagram of a vehicle wireless hub in accordance with the present invention.

Referring to FIG. 4, a VWH 100 can include the following basic functions: a vehicle power connector 401, a network processor 402, a wide-area transmission circuit 403, and one or more short-range wireless transmission circuits 404 for different short-range wireless communication standards. The vehicle power connector 401 allows the VWH 100 to draw power from the car battery. The long-range transmission circuit 403 is responsible for data transmission and reception with the long-range wireless network 40, (e.g. 3G or 4G networks). The short-range wireless transmission circuits 404 are responsible providing the short-range wireless networks 110 (e.g. WiFi, Bluetooth, etc) for data communications with the electronic devices 210, 310, 320 (FIGS. 1-3).

Figure 5:
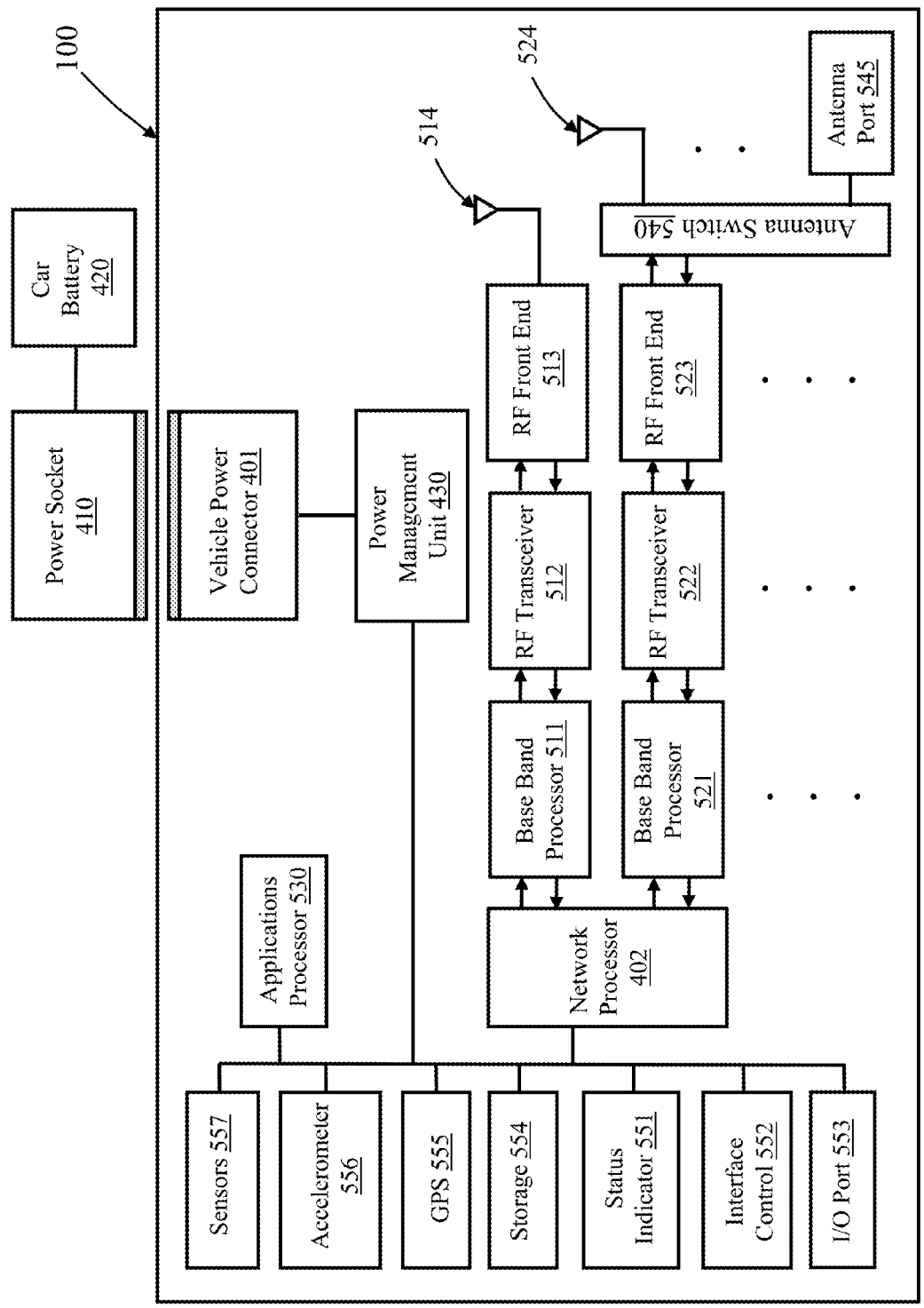
FIG. 5 is a detailed functional diagram of a vehicle wireless hub in accordance with the present invention.

Referring to FIG. 5, an exemplified VWH 100 includes the vehicle power connector 401, the network processor 402, a base band processor 511, an RF transceiver 512, an RF front end 513, and an antenna 514 in the long-range transmission circuit 403 (FIG. 4). The vehicle power connector 401 can be plugged into a power socket 410 built in the vehicle, which allows the VWH 100 to draw power from the car battery 420. In one implementation, the vehicle power connector 401 is plugged into the car's cigarette lighter receptacle. Cigarette lighters have been a standard feature in automobiles since 1925. In general, cigarette lighter receptacles can provide 12 volt and up to 10 amperes, which is much more than the battery power in existing personal hotspot devices. In another implementation, the vehicle power connector 401 can also draw power from an I/O port (553, FIG. 5), such as USB connectors and IPod chargers, which are increasingly popular in modern cars. If a car does not provide power to cigarette lighters or an I/O port while the car is off, a physical or software bypass can be implemented on the accessory switch of the car.

A vehicle's battery 420 is much larger and has higher voltages than batteries in personal hotspot devices. An advantageous feature of the presently disclosed system is that the strong battery power in the vehicle 50 allows the VWH 100 to extend its operational range beyond its associated vehicle 50 to electronic devices 310, 320 (FIGS. 1-3). For example, the disclosed vehicle-based VWH 100 can provide short-range networks that operate farther than 0.25 mile, 0.5 mile, or one mile, which is a much wider range than short range wireless networks in existing personal hotspot technologies. Moreover, the disclosed vehicle-based VWH 100 can run for a longer operational period, without recharging the car battery, than personal hotspot devices. Because car batteries charge while the car is in motion, the disclosed vehicle-based VWH 100 can operate indefinitely. The increased operational range and time allow the VWH to become a more effective personal hub than conventional technologies. A power management unit 430 can generate the appropriate voltage and current from the car battery 420.

The exemplified VWH 100 also includes one or more short-range wireless transmission circuits 404 (FIG. 4) each comprising a base band processor 521, an RF transceiver 522, and an RF front end 523, and antenna 524. Each RF front end can include power amplifiers, low noise amplifiers, switches, and filters, etc. Different short-range wireless transmission circuits 404 can provide short-range wireless networks 110 in different short-range wireless standards such as WiFi, Bluetooth™, Zigbee, etc. An antenna switch 540 controls incoming and outgoing data flow among the different short-range wireless transmission circuits 404. In some implementations, an antenna jack 545 can be included, to connect to an auxiliary antenna to increase the operational range.

The network processor 402 directs all incoming and outgoing data through the long-range wireless network 40 and the short-range wireless networks 110. The exemplified VWH 100 can also include an applications processor 530, and a status indicator 551 which can show the functional status and the operation mode (e.g. normal operation, reboot, no long-range connection, low power, etc). The exemplified VWH 100 can also include an interface control 552 to turn the VWH 100 on and or to change its range. The interface can use environmental sensors 557 to sense the driver's or a passenger's gestures (e.g. hand waving movements) or voice instructions to control the vehicle through the ECU 202. The exemplified VWH 100 can include an I/O port 553 such as USB connectors, which can serve to either power other devices or act as a physical interface. Local data storage 554 can be included to store data to enable the VWH 100 to act as a limited personal server. In this implementation, either the network processor 402 or the application processor 530 can handle the data flow, and control the writing and retrieval of data in the data storage 554.

The VWH 100 can also include a global positioning system (GPS) 555, accelerometers 556, and environmental sensors (e.g. sound or video sensors) 557 in communication with the network processor 402. The GPS 555 can make it easier for different vehicles 50, 51 to locate each other so that the VWHs 100 can generate the above described mesh networks between multiple vehicles. The accelerometers 556 and environmental sensors 557 allow users to monitor their vehicles with their electronic devices 210, 310, 320 (FIGS. 1-3). For example, environmental sensors can measure the temperature in the car to allow the user to remotely turn on the heater or air conditioning before the user enters the car. The sensors can also assure the safety and security of the vehicle.

Figure 6:
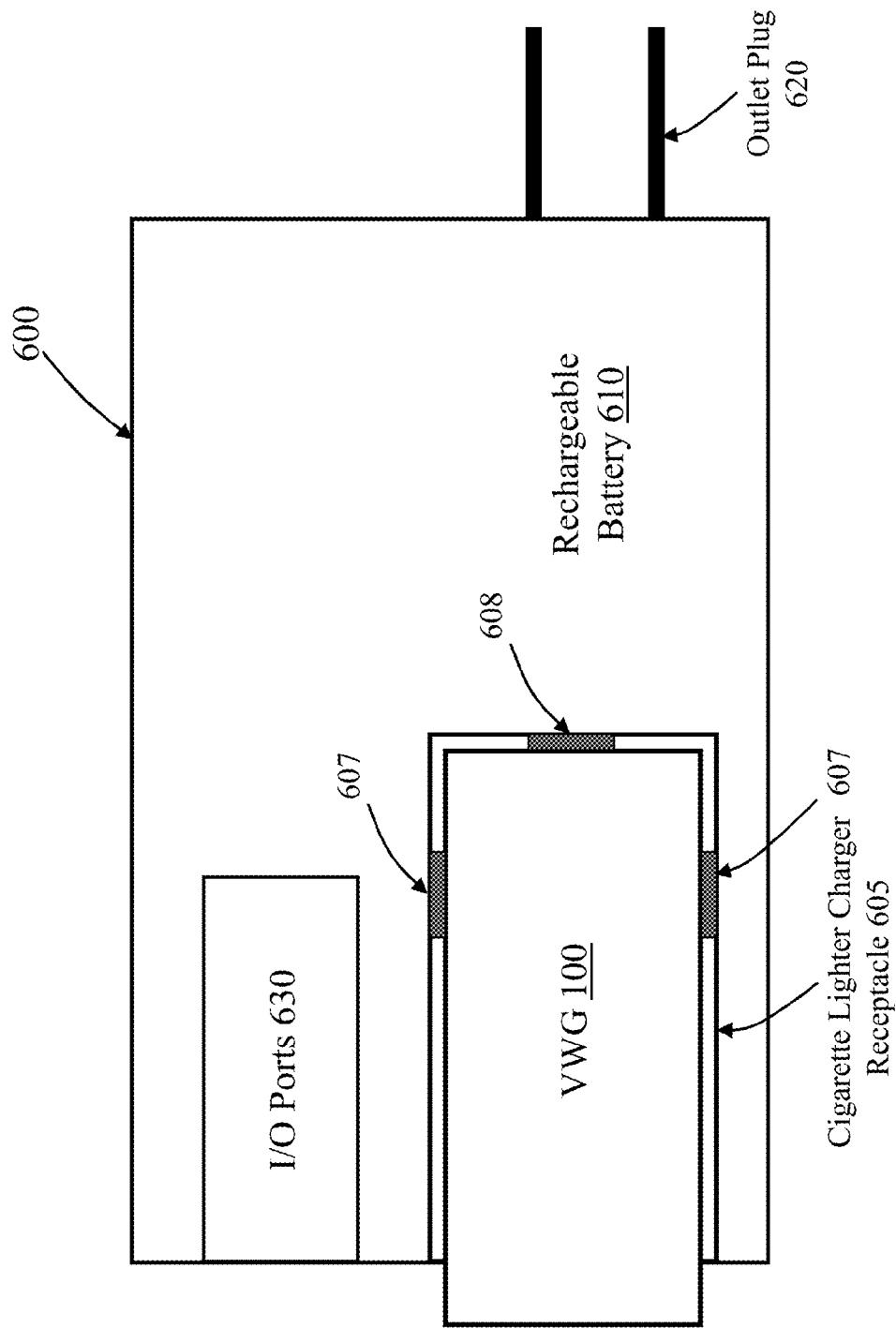
FIG. 6 is a schematic diagram of a portable vehicle wireless hub having rechargeable power in accordance with the present invention.

In some embodiments, referring to FIG. 6, a portable vehicle wireless hub 600 includes a VWH 100 that is plugged into a cigarette lighter charger receptacle 605 like ones found in vehicles with electric contacts 607 and 608. The portable vehicle wireless hub 600 also includes a rechargeable battery 610, and a retractable outlet plug 620 which can be plugged into a regular wall outlet to charge the rechargeable battery 610. After unplugging from an outlet, the VWH 100 can function as a portable personal wireless hub powered by the rechargeable battery 610. A user can thus carry the VWH 100 away from the vehicle. For example, the user can take a hike after parking his car. The user can bring the VWH 100 during his trip to provide access to his short-range wireless network and the Internet via the long-range wireless network. The portable vehicle wireless hub 600 can also include an I/O port 630 such as USB connectors.

In should be understood that the disclosed wireless systems are suitable for various standards and protocols for short-range and long-range wireless communications, such as Global System for Mobile communications (GSM), Universal Mobile Telecommunications Service (UMTS) Code Division Multiple Access (CDMA). GSM can include GPRS, EDGE and CSD. UMTS can include Wideband Code Division Multiple Access (WCDMA), High-Speed Packet Access (HSPA), High-Speed Downlink Packet Access (HSDPA), UMTS-TDD, Long Term Evolution (LTE), and LTE-Advanced. CDMA can include CDMA2000, and Ultra Mobile Broadband (UMB). Suitable wireless communications standards also include 3GPP, IMT-2000, WiMax, WiBro, WiFi, WLAN, 802.16, and others. Different wireless standards also include different software algorithms for signal encoding and decoding.

What is claimed is:

1. A vehicle wireless hub, comprising:
a vehicle power connector configured to draw power from a vehicle battery on a vehicle, wherein the vehicle power connector is configured to supply power to the first wireless transmission and receive circuit, the second wireless transmission and receive circuit, and the network processor;
the first wireless transmission circuit configured to send or receive data with at least one base station in a long-range wireless network;
the second wireless transmission circuit configured to provide a short-range wireless network capable of sending or receiving data directly to and from at least one electronic device in the short-range wireless network; wherein the second wireless transmission and receive circuit is configured to communicate in the short-range wireless network in at least one of a plurality of wireless standards;
wherein the network processor is configured to receive data from the first wireless transmission and receive circuit and the second wireless transmission and receive circuit and is capable of operating autonomously with each of the first transmission and receive circuit and second transmission and receive circuit;
an application processor capable of processing data received from the network processor; and
at least one global positioning system (GPS) configured to monitor a location of the vehicle and wherein the GPS allows the vehicle wireless hub of the vehicle to locate at least one other vehicle wireless hub to generate at least one mesh network between the vehicle wireless hub and the at least one other vehicle wireless hub.

2. The vehicle wireless hub of claim 1, wherein the first wireless transmission and receive circuit is configured to send or receive data in the long-range wireless network in at least one of the wireless standards: Universal Mobile Telecommunications System (UMTS), WiMax, WiBro, 3GPP, LTE, or IMT-2000.

3. The vehicle wireless hub of claim 1, wherein the vehicle power connector is configured to be plugged into a cigarette lighter receptacle equipped in the vehicle to draw power from the vehicle battery.

4. The vehicle wireless hub of claim 1, wherein the vehicle power connector is configured to be plugged into an I/O port equipped in the vehicle to draw power from the vehicle battery.

5. The vehicle wireless hub of claim 1, further comprising: an electronic control unit configured to control operation of the first vehicle.

6. The vehicle wireless hub of claim 1, further comprising: a power management unit configured to modify the voltage or current received from the first vehicle power connector to supply power to the first wireless transmission and receive circuit, the second wireless transmission and receive circuit, and the first network processor.

7. The vehicle wireless hub of claim 1, further comprising an accelerometer and an environmental sensor, which are in communication with the network processor and wherein the network processor is configured to send location, acceleration, temperature, safety, or security of the vehicle to the electronic device.

8. The vehicle wireless hub of claim 1, wherein the environmental sensor is configured to detect gestures or voice instructions of a driver, wherein the first network processor and the second transmission and receive circuit are configured to allow the driver to control the first vehicle.

9. The vehicle wireless hub of claim 1, further comprising: a personal server connected to the short-range wireless network and configured to store data or send data to the at least one electronic device.

10. The vehicle wireless hub of claim 9, wherein the first application processor is configured to control the writing and retrieval of data in the personal server.

11. The at least one vehicle wireless hub of claim 1, further comprising: a rechargeable battery configured to supply power to the first wireless transmission and receive circuit, the second wireless transmission and receive circuit, and the first network processor when the at-least one vehicle wireless hub is disconnected from the first vehicle battery.

12. The at least one vehicle wireless hub of claim 1, wherein the first network processor and the second transmission and receive circuit are configured to provide the short-range wireless network to at least one of the electronic devices while the vehicle is in motion.

13. The vehicle wireless hub of claim 1, further comprising:
a personal server connected to the short-range wireless network and configured to store data received from or sent to the electronic devices, wherein the first network processor and the short-range transmission and receive circuit are configured to allow the wireless device to access the personal server connected to the short-range wireless network.

14. The vehicle wireless hub of claim 1, which is further configured to connect to an electronic control unit in the first-vehicle, wherein the network processor and the second transmission and receive circuit are configured to allow the at least one electronic device to monitor or control the vehicle.

15. The at least one vehicle wireless hub of claim 1, wherein the short range wireless network can operate farther than 0.5 miles.

16. The vehicle wireless hub of claim 1, which is further configured to be removed from the vehicle.

17. A vehicle wireless hub, comprising:
a vehicle power connector configured to draw power from a vehicle battery on a vehicle, wherein the vehicle power connector is configured to supply power to a first wireless transmission and receive circuit, a second wireless transmission and receive circuit, a third wireless transmission and receive circuit and a network processor;

the first wireless transmission and receive circuit configured to send or receive data with base stations in a long-range wireless network;

the second wireless transmission and receive circuit configured to provide a short-range wireless network capable of sending or receiving data to and from electronic devices in the short-range wireless network;

the third wireless transmission and receive circuit configured to provide a short-range wireless network capable of sending or receiving data to and from electronic devices in the short-range wireless network; and wherein the network processor is configured to receive data from the first wireless transmission and receive circuit, the second wireless transmission and receive circuit, and the third wireless transmission and receive circuit and is capable of operating autonomously with each of the first transmission and receive circuit, second transmission and receive circuit, and third transmission and receive circuit, and further including an application processor which is capable of processing data received from the network processor; and at least one global positioning system (GPS) configured to monitor a location of the vehicle and wherein the GPS allows the vehicle wireless hub of the vehicle to locate at least one other vehicle wireless hub to generate at least one mesh network between the vehicle wireless hub and the at least one other vehicle wireless hub.

18. The vehicle wireless hub of claim 17, wherein the first wireless transmission and receive circuit includes a first antenna; and the second wireless transmission and receive circuit includes an antenna switch coupled to both a second antenna and a third antenna, wherein the antenna switch is adapted to control incoming and outgoing flow among the second antenna and the third antenna.

19. The vehicle wireless hub of claim 17, wherein the third wireless transmission and receive circuit is configured to communicate in the short-range wireless network in at least one of the wireless standards: WiFi, Bluetooth™, and Zigbee.

20. A vehicle wireless hotspot, having a vehicle wireless hub comprising:

a high voltage power source configured to supply power to a first wireless transmission and receive circuit, a second wireless transmission and receive circuit, a network processor and a personal server;

the first wireless transmission and receive circuit configured to send or receive data with base stations in a long-range wireless network;

the second wireless transmission circuit configured to provide a short-range wireless network capable of sending or receiving data to and from electronic devices in the short-range wireless network;

wherein the network processor is configured to receive data from the first wireless transmission and receive circuit and the second wireless transmission and receive circuit and is capable of operating autonomously with each of the first wireless transmission and receive circuit and second transmission and receive circuit, and further including an application processor which is capable of processing data received from the network processor;

a personal server connected to the short-range wireless network and configured to store or send data received from at least one of the electronic devices; and at least one global positioning system (GPS) configured to monitor a location of the vehicle and wherein the GPS allows the vehicle wireless hub of the vehicle to locate at least one other vehicle wireless hub to generate at least one mesh network between the vehicle wireless hub and the at least one other vehicle wireless hub.

21. The vehicle wireless hotspot of claim 20, wherein the second wireless transmission and receive circuit is configured to communicate in the short-range wireless network in at least one of the wireless standards: WiFi, Bluetooth™, and Zigbee.

22. The vehicle wireless hub of claim 20, further comprising: at least one environmental sensor configured to control the vehicle by sensing at least one of the group consisting of: driver's body gestures, driver's eye movements, and driver's voice instructions.

23. The vehicle wireless hub of claim 20, further comprising: at least one accelerometer.

24. The vehicle wireless hub of claim 20, wherein the electronic control unit is configured to send monitoring signals to at least one of the electronic devices.

25. The vehicle wireless hub of claim 24, wherein the electronic control unit is configured to receive control signals from at least one of the electronic devices.

26. A plurality of vehicle wireless hubs forming at least one mesh network, each vehicle wireless hub comprising:

a vehicle power connector configured to draw power from a vehicle battery on a vehicle, wherein the vehicle power connector is configured to supply power to a first wireless transmission and receive circuit, a second wireless transmission and receive circuit, and a network processor;

the first wireless transmission and receive circuit configured to send to or receive data from base stations in a long-range wireless network;

the second wireless transmission and receive circuit configured to provide a short-range wireless network capable of sending or receiving data directly to and from at least one other vehicle wireless hub in the short-range wireless network; wherein the second wireless transmission and receive circuit is configured to communicate in the short-range wireless network in at least one of a plurality of wireless standards;

wherein the network processor is configured to receive data from the first wireless transmission and receive circuit and the second wireless transmission and receive circuit and is capable of operating autonomously with each of the first transmission and receive circuit and the second transmission and receive circuit, an application processor which is capable of processing data received from the network processor; and at least one global positioning system (GPS) configured to monitor a location of the vehicle and wherein the GPS allows the vehicle wireless hub of the vehicle to locate the at least one other vehicle wireless hub to generate the at least one mesh network between the vehicle wireless hub and the at least one other vehicle wireless hub.

27. The plurality of vehicle wireless hubs of claim 26, wherein the first wireless transmission and receive circuit is configured to send or receive data to the second vehicle wireless hub over long range in at least one of the wireless standards: Universal Mobile Telecommunications System (UMTS), WiMax, WiBro, 3GPP, LTE, or IMT-2000.

28. The plurality of vehicle wireless hubs of claim 26, wherein the second wireless transmission circuit is configured to communicate in at least one of the wireless standards: WiFi, Bluetooth™, and Zigbee.

29. The plurality of vehicle wireless hubs of claim 26, wherein the first wireless transmission and receive circuit is configured to send or receive data directly to the at least one other vehicle wireless hub over long range in at least one of the wireless standards: Universal Mobile Telecommunications System (UMTS), WiMax, WiBro, 3GPP, LTE, or IMT-2000; and wherein the at least one vehicle wireless hub further includes a third wireless transmission and receive circuit which is configured to provide a short-range wireless network capable of directly sending or receiving data to and from the second wireless transmission and receive circuit in the short-range wireless network; wherein the second wireless transmission circuit is configured to communicate in the short-range wireless network in at least one of a plurality of wireless standards.

* * * * *

UNITED STATES PATENT AND TRADEMARK OFFICE
CERTIFICATE OF CORRECTION

| | | |
|---|---|---|
| PATENT NO. | : 9,866,277 B2 | Page 1 of 1 |
| APPLICATION NO. | : 13/209576 | |
| DATED | : January 9, 2018 | |
| INVENTOR(S) | : Wang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 317 days.

Signed and Sealed this
Fifth Day of February, 2019

Andrei Iancu
*Director of the United States Patent and Trademark Office*